(12) United States Patent
Miyanowaki et al.

(10) Patent No.: US 7,513,554 B2
(45) Date of Patent: Apr. 7, 2009

(54) CUP HOLDER

(75) Inventors: Takeru Miyanowaki, Aichi-ken (JP); Katsuhiro Katagiri, Aichi-ken (JP)

(73) Assignee: Toyoda Gosei Co., Ltd., Aichi-pref. (JP)

( * ) Notice: Subject to any disclaimer, the term of this patent is extended or adjusted under 35 U.S.C. 154(b) by 34 days.

(21) Appl. No.: 11/702,503

(22) Filed: Feb. 6, 2007

(65) Prior Publication Data

US 2007/0246961 A1    Oct. 25, 2007

(30) Foreign Application Priority Data

Apr. 25, 2006 (JP) .............................. 2006-120559

(51) Int. Cl.
*B60N 3/10* (2006.01)
(52) U.S. Cl. .................................. 296/37.8; 296/24.34
(58) Field of Classification Search .............. 296/24.34, 296/37.8
See application file for complete search history.

(56) References Cited

U.S. PATENT DOCUMENTS

| 5,857,633 | A  | * | 1/1999  | Pelchat et al.    | 248/311.2  |
| 6,779,770 | B2 | * | 8/2004  | Kaupp             | 248/311.2  |
| 6,799,705 | B1 | * | 10/2004 | Lutoslawski       | 224/483    |
| 7,131,690 | B2 | * | 11/2006 | Bollaender et al. | 297/188.17 |

FOREIGN PATENT DOCUMENTS

JP    A-2004-299430    10/2004

* cited by examiner

*Primary Examiner*—Dennis H Pedder
*Assistant Examiner*—Melissa A Black
(74) *Attorney, Agent, or Firm*—Posz Law Group, PLC

(57) ABSTRACT

A cup holder of rotary type has a holder part provided on a back face of a lid body. A support part which is urged so as to move apart from the holder part and pivotally connected to the holder part at its one end will move up and down along with opening and closing motions of the lid body. It is possible to realize the cup holder having high holding performance for a tall container without requiring a large storing space.

7 Claims, 4 Drawing Sheets

CUP HOLDER

BACKGROUND OF THE INVENTION

1. Field of the Invention

The present invention relates to a cup holder.

2. Related Art

Generally, in a vehicle such as an automobile, a cup holder is provided in a vehicle room. As such cup holders, various types of cup holders including slide type, rotary type, etc. have been heretofore proposed.

Among them, there is a cup holder of the rotary type which is so constructed that the cup holder is stored in an opening provided in an instrument panel or the like, while it is not used, and a lid for covering the opening can be rotated around a shaft, when it is used, whereby a cup mounting part provided on a back face of the lid will be exposed (JP-A-2004-299430, for example).

In case of mounting a tall container such as a PET bottle on the cup holder of the rotary type, it is considered that the cup holder should be made larger in height, in order to enhance holding performance for the container. However, making the cup holder larger in height will require a large space in a direction of depth, when the lid is closed, and an installing place of the cup holder will be restricted. Under the circumstances, there has been disclosed, in Patent Document 1, an art of a cup holder which is adapted to be elevated in height, when a container such as a beverage bottle has been mounted. However, this cup holder is so constructed that an elevating wall member will move upward by a weight of the beverage bottle itself. Therefore, there has been a problem that in case where an amount of the beverage has decreased and the weight of the beverage bottle itself is not exerted, the holding performance in a vertical direction is unable to be enhanced by moving the elevating wall member upward.

SUMMARY OF THE INVENTION

In view of the circumstances, an object of the invention is to solve the above described problem, and to provide a cup holder of rotary type which requires a small storing space, while it is not used, and always has high holding performance, while it is used.

(1) In order to solve the above described problem, according to an aspect of the invention, there is provided a cup holder comprising:

a lid body fitted to a vehicle member so as to be opened or closed;

a holder part provided on a first face of the lid body for storing a container; and a support part pivotally held by the holder part and urged by an urging member in a direction of moving apart from the holder part, wherein the support part is adapted to move upward by an urging force, when the lid body is opened, and to move close to the holder part against the urging force, when the lid body is closed.

According to this aspect of the invention, while the lid body is closed, the support part is arranged in a state brought close to the holder part against the urging force. When the cup holder is used, the urging force will be exerted along with opening motion of the lid body to move the support part apart from the holder part. In a state where the cup holder has become usable after the lid body is opened, the other end of the support part opposite to the pivotally held end will move upward by the urging member, whereby the cup holder having high supporting power in the vertical direction can be realized. Moreover, because the support part is stored in proximity of the holder part while the cup holder is not used, a large installing space in a direction of depth is not required. Further, because the upward and downward movements of the support part are attributed to the urging force along with the opening and closing motions of the lid body, it is possible to move the support part upward, even in case where the weight of the beverage itself is not exerted.

According to another aspect of the invention, a stopper member which is urged so as to move apart from the holder part is pivotally held between the support part and the holder part, and the stopper member is adapted to be engaged with the support part from below, in an open state of the lid body, thereby to prevent the support part from moving downward.

According to this aspect of the invention, even in case where a load is exerted on the support part in a downward direction when the cup holder is used, it is possible to stably maintain the elevated position of the support part. As the results, the cup holder having excellent reliability of supporting power can be realized.

According to the invention, it is possible to obtain a cup holder of rotary type which has excellent holding power even with respect to a tall container, without increasing a storing space for the cup holder.

DETAILED DESCRIPTION OF THE PREFERRED EMBODIMENTS

Figure 1:
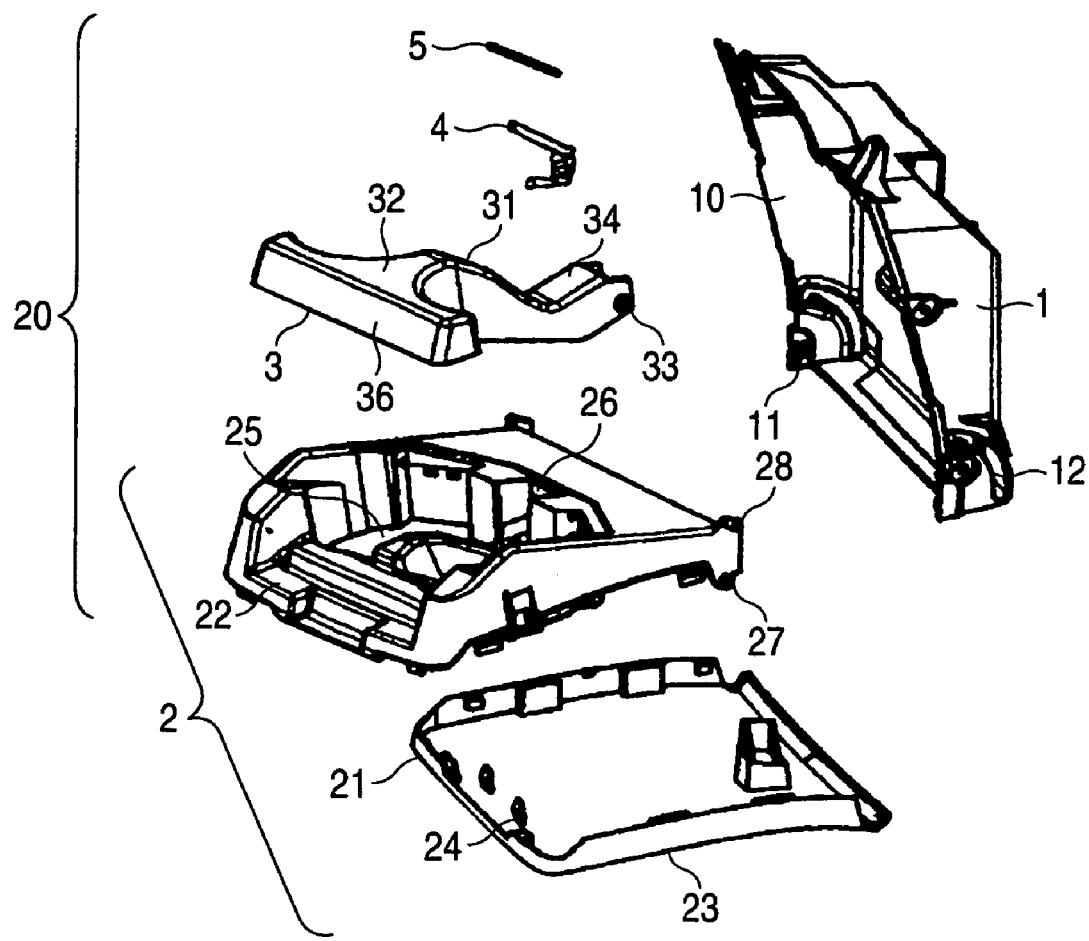
FIG. 1 is an exploded view showing a structure of a cup holder according to the invention.

Now, an embodiment according to the invention will be described referring to the drawings. It is to be noted that longitudinal and vertical directions in the description are the same as in a real vehicle.

FIG. 1 is an exploded view showing a structure of a cup holder in an embodiment according to the invention. The cup holder in this embodiment is fitted to a back face of a console box for use by passengers in rear seats. The back face of the console box has a space for storing the cup holder, and in this space, the cup holder according to the invention is constructed including a panel part 1 which is secured by a securing member, which are not shown, and a lid body 2 which is pivotally held in a lower part of the panel part 1 so as to rotate and connected to the panel part. The panel part 1 is in a box shape having an opening 10 which is open backward, and a cup holder body 20 will be stored in this opening 10. The lid body 2 includes an outer case 21 having a surface part 23 which will close the opening 10 of the panel part and will be flush with the back face of the console box in a closed state, and a holder part 22 having a cup mounting part 25 (container mounting part). The outer case 21 is provided with a pair of hooks 24 on an inner face thereof. The hooks will be inserted into hook holding parts (not shown) which are formed on a face of the holder part 22 facing the outer case 21, to be locked. In this manner, the outer case 21 and the holder part 22 are connected into an integral body thereby to form the lid body 2.

Moreover, the holder part 22 is provided with a first shaft 27 which is projected outward from a side face of the holder part 22 near a connecting end with respect to the panel part 1. On the other hand, the panel part 1 is provided with a shaft hole 11 into which the first shaft 27 will be inserted. The holder part 22 is further provided with a guide shaft 28 which is projected from a position near the first shaft 27 and adapted to be engaged with a guide groove 12 which is provided in a corresponding position of the panel part 1, thereby to function as a guide for opening and closing operations of the lid body 2. Still further, the cup mounting part 25 in a concave shape which is open backward in an open state of the lid body is formed in the holder part 22. In front of the cup mounting part 25, there is formed a bearing part 26 to be engaged with a second shaft 33 of a support part 3, which will be described below.

The support part 3 is provided in the cup mounting part 25 so as to divide the cup mounting part 25 to a right and a left halves. The support part 3 is formed in a substantially T-shape having a support portion 31 which extends in a longitudinal direction in an open state of the lid body, and an arm portion 32 which extends laterally at a back end of the support portion 31. The support portion 31 has an upper face 34 and side faces, and is formed in C-shape in section having a space 36 inside. The cup mounting part 25 is divided in two by this support part 3 so that two containers can be respectively held in the right and left halves. The second shaft 33 to be pivotally supported by the aforesaid bearing part 26 which is provided in the cup mounting part 25 is formed at a front end of the support portion 31. A coil spring 4 as urging member is fitted over the second shaft 33 by means of a shaft 5. The coil spring 4 is locked to the support part 3 at its one end, and locked to the bearing part 26 at the other end. The coil spring 4 is always urged so as to move apart from the lid body 2, and the support part 3 is stored in the cup mounting part 25 of the holder part 22 resisting an urging force, while the lid body 2 is closed (See FIG. 2).

Figure 2:
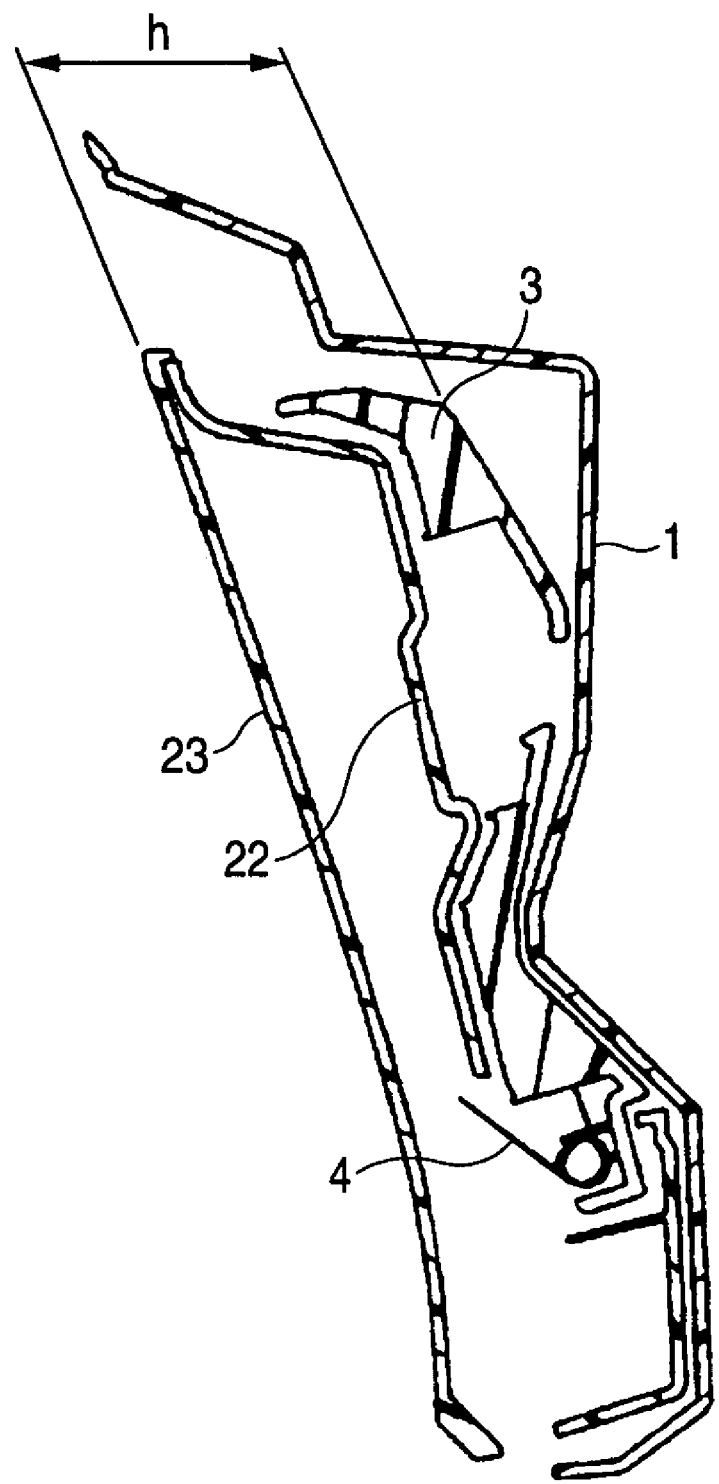
FIG. 2 is a sectional view showing the cup holder according to the invention while the cup holder is stored.

Operation of the cup holder having the above described structure will be described. As shown in FIG. 2, the lid body 2 is closed while the cup holder is not used, and the cup holder body 20 is stored so as to be flush with the back face of the console box. On this occasion, the coil spring 4 is contracted resisting the urging force, and the support part 3 has been brought close to the holder part 22 to be contained together with the holder part 22, in the box-like space in the panel part 1. When the cup holder is used, lock between the lid body 2 and the panel part 1, which is not shown, will be released. Then, the lid body 22 will be rotated around the first shaft 27 of the holder part 22, whereby the lid body 2 will be placed on a floor panel and the cup holder body 20 will be withdrawn from the state contained in the panel part 1. On this occasion, the aforesaid guide shaft 28 will be rotated along the guide groove 12, and hence, the lid body 2 will perform stable opening motion. Along with the opening motion of the lid body 2, contracting force of the coil spring 4 will be released, and the support part 3 which has been positioned close to the holder part 22 will move upward so as to move apart from the holder part 22 (See FIG. 3).

Figure 3:
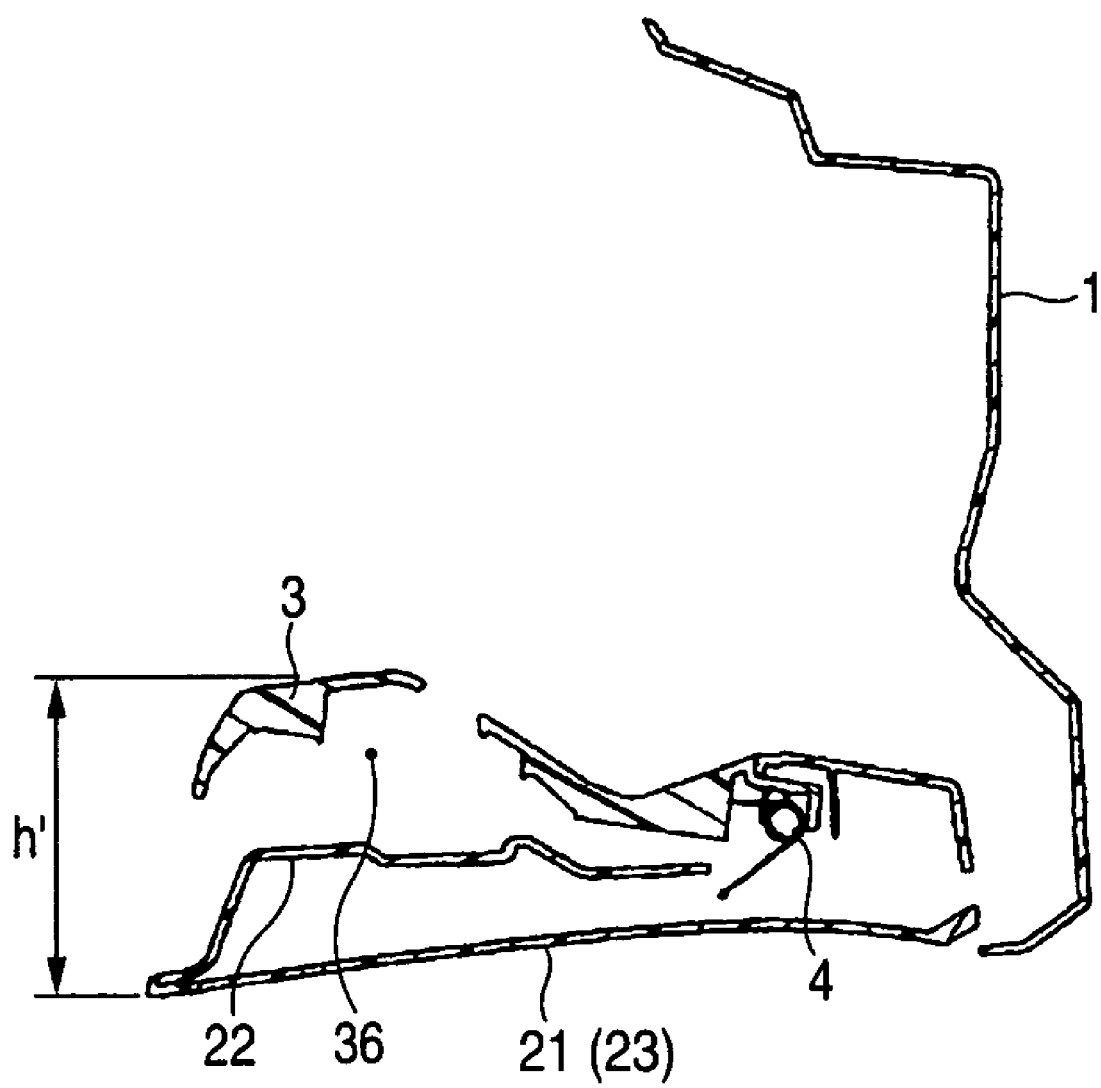
FIG. 3 is a sectional view showing the cup holder according to the invention while the cup holder is used.

In order to store the cup holder body 20, the lid body 2 will be rotated around the first shaft 27 so as to approach the opening of the panel part 1, whereby the support part 3 and the holder part 22 will be stored in the opening of the panel part 1. In association with the closing motion, the support part 3 will be brought into contact with a bottom face of the panel part 1, and the coil spring 4 will be contracted to decrease a distance between the holder part 22 and the support part 3, whereby both the parts come close to each other. As the closing motion further proceeds, the support part 3 will move downward to be stored in the holder part 22, and in this state, the lid body 2 will be closed having the cup holder body 20 stored therein. In this manner, the support part 3 will be stored in the holder part 22 against the urging force of the coil spring 4, and the cup holder body 20 will be stored in the opening. Therefore, a depth (h) of the opening of the panel part 1 as shown in FIG. 2 need not be such a size as affording a height (h') for the upward movement of the support part 3 as shown in FIG. 3, and can be made smaller. In other words, because the storing part of the cup holder body 20 can be made small, restriction of the installing place for the cup holder will be decreased, and the cup holder having enhanced freedom in installation can be obtained.

When the cup holder is used, the contracting force of the coil spring 4 will be released with the opening motion of the lid body 2, and the support part 3 will move upward, whereby holding performance in a vertical direction can be enhanced. As the results, it is possible to hold a tall container such as a PET bottle, even though a large space in a direction of depth is not secured. These upward and downward movements of the support part 3 are effected by the urging force which will be exerted along with the opening and closing motions of the lid body 2, but not attributed to the weight of the container itself. Therefore, the cup holder which has always high holding performance while it is used (while the lid body is open) can be obtained.

Embodiment 2

Figure 4:
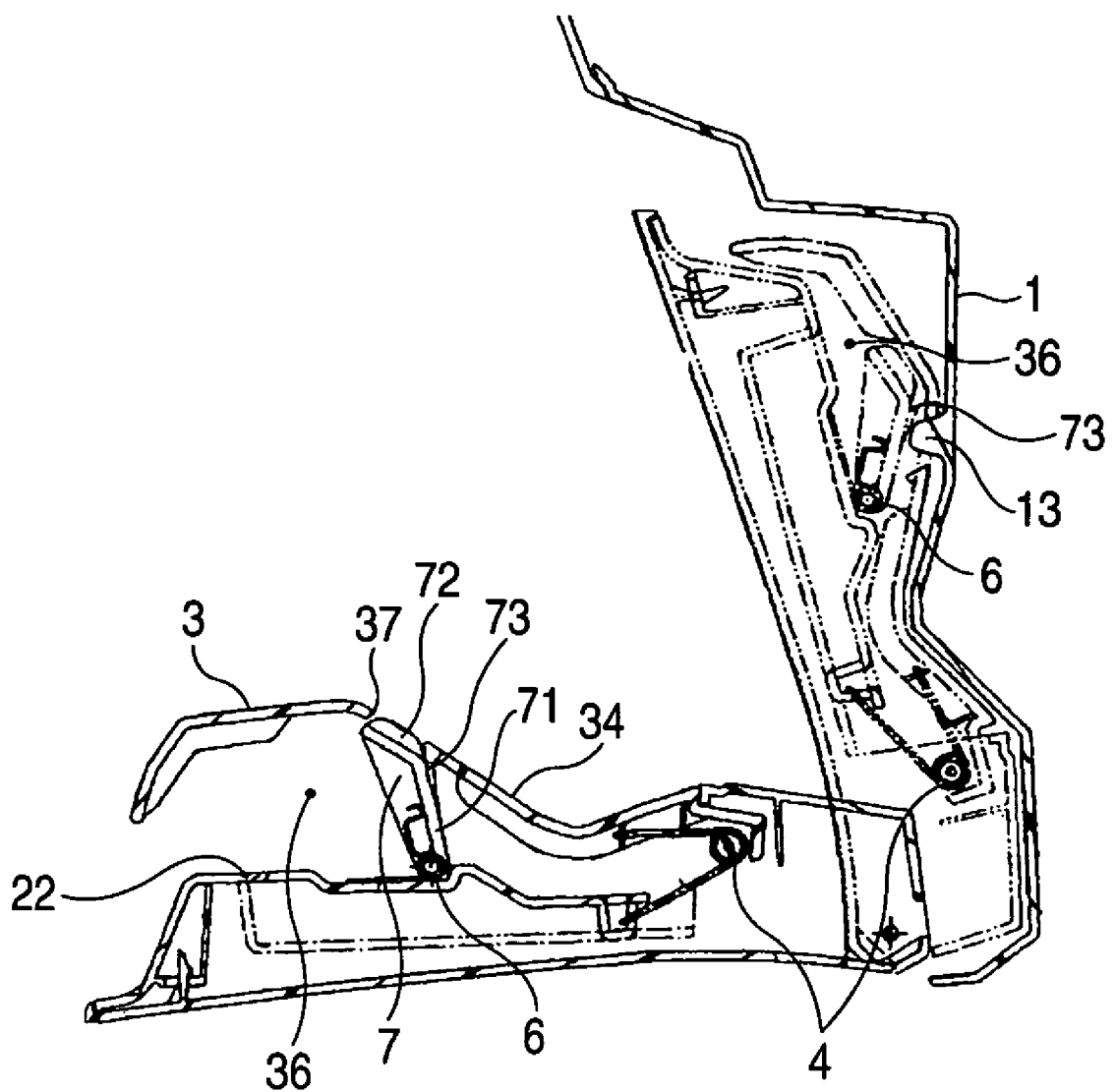
FIG. 4 is a sectional view showing a second embodiment of the cup holder according to the invention.

Another embodiment according to the invention is shown in FIG. 4. It is to be noted that only those points where this embodiment is different from the above described embodiment will be described. In FIG. 4, a two-dot chain line shows a state where the lid body 2 is closed, and a solid line shows a state where the lid body 2 is opened. The support part 3 is provided with a through hole 37 on the upper face 34, as shown in the drawing in the open state of the lid body 2. Moreover, a stopper member 7 is pivotally supported in the space 36 between the support part 3 and the holder part 22, by means of a spring 6 held by the holder part 22. The stopper member 7 has a leg portion 71 which is pivotally supported by the holder part 22 at its one end, and a head portion 72 connected to the other end of the leg portion 71. A lock portion 73 in a form of cut-out is formed on the head portion 72. The spring 6 is also urged so as to move the stopper member 7 apart from the holder part 22. When the lid body 2 is opened, the leg portion 71 will be erected by the urging force, and the head portion 72 will be inserted into the through hole 37, in such a manner that the lock portion 73 may be engaged with an opening edge of the through hole 37.

On the other hand, the panel part 1 is provided, on the bottom face thereof, with a push plug 13 which is projected into the storing space, as shown in the drawing in the open state of the lid body. The push plug 13 is so designed as to be inserted into the through hole 37 which is provided in the support part 3, in the closed state of the lid body. When the push plug 13 has been inserted into the through hole 37, the stopper member 7 will be pressed toward the holder part 22 against the urging force of the spring 6 to be pushed into the space 36 of the support part which is provided between the support part 3 and the holder part 22. Consequently, the lock portion 73 will be disengaged from a circumferential edge of the though hole 37, whereby the support part 3 will be in position to come close to the holder part 22.

Operation of the cup holder in this embodiment will be described. Along with the opening motion of the lid body 2, the support part 3 will move upward against the urging force of the coil spring 4, in the same manner as in the first embodiment. At the same time, along with the upward movement of the support part 3, the urging force of the spring 6 will make the stopper member 7 erected so as to enlarge the space 36 of the support part. In this state, the head portion 72 of the stopper member 7 will be inserted into the through hole 37 in the upper face 34 of the support portion 31, and the lock portion 73 will be engaged with the opening edge of the through hole 37. In this manner, the stopper member 7 will lift the support portion 31 of the support part 3 from the back face thereof and hold it, whereby the upwardly moved position of the support part 3 can be maintained. Accordingly, even when a load has been applied to the support part 3 from the above, the support part 3 can be prevented from moving downward, and more reliable holding performance can be maintained.

As described above, in this embodiment 2, it is also possible to obtain the cup holder having the smaller storing space and the high holding performance in the vertical direction, in the same manner as in the embodiment 1. Moreover, it is possible to prevent the support part 3 from moving downward from the elevated position to deteriorate the holding performance, by means of the stopper member 7. Consequently, the support part 3 can be reliably held at the elevated position, and the cup holder having enhanced reliability in holding power can be obtained.

Although not shown, it is also possible to provide a second guide shaft projecting outward, on the arm portion 32 which extends to the right and left from the support part, and a second guide groove into which the second guide shaft is to be inserted, on a side face of the cup mounting part 25 in the holder part 22. By means of this second guide mechanism, the support part will be able to perform the upward and downward movements in a stable manner.

As described above, according to the cup holder of the invention, it is possible to realize a cup holder having high holding performance in the vertical direction, without requiring a large storing space. Because the large storing space is not required, an installing place can be freely selected in a vehicle room, and versatility of the cup holder can be enhanced.

What is claimed is:

1. A cup holder comprising:
   a lid body fitted to a vehicle member so as to be opened or closed, the lid body including:
      a holder part provided on a first face of the lid body for storing a container; and
      a support part pivotally held by the holder part and urged by an urging member in a direction of moving apart from the holder part, wherein the support part is configured to move upward by an urging force when the lid body is opened, and to move close to the holder part against the urging force when the lid body is closed,
   a panel part to which the lid body is rotatably connected, wherein the panel part is formed in a box shape with an opening and a space for storing the holder part therein,
   a stopper member which is urged so as to move apart from the holder part and which is pivotally held between the support part and the holder part, wherein
      the stopper member is configured to be engaged with the support part from below in an opened state of the lid body, thereby to prevent the support part from moving downward, and
      the lid body is pivotally held in a lower part of the panel part so that the lid body is rotatable around the lower part of the panel part between the opened state and a closed state.

2. The cup holder according to claim 1, wherein the support part is formed in a substantially T-shape having a support portion which extends in a first direction in an open state of the lid body, and an arm portion which extends laterally at a back end of the support portion.

3. The cup holder according to claim 1, wherein a container mounting part having a concave shape is formed in the holder part.

4. The cup holder according to claim 3, the support part is provided in the container mounting part so as to divide the container mounting part to two halves.

5. The cup holder according to claim 3, wherein the support part is stored in the container mounting part of the holder part resisting an urging force of the urging member, when the lid body is closed.

6. The cup holder according to claim 1, wherein
   the holder part is stored in the panel part so that an outer case of the holder part is flush with a back face of the panel part.

7. The cup holder according to claim 1, wherein
   the support part has a through hole in a middle thereof,
   the stopper member is composed of at least a head portion, a leg portion, a lock portion, and a spring for biasing the lock portion to an erected position,
   a first end of the leg portion is attached to the lid body, and
   a second end of the leg portion is attached to the head portion at a predetermined angle corresponding to the support part so that the head portion engages the through hole and the lock portion engages an edge of the through hole to maintain the support member when the cup holder is in the opened state.

* * * * *